Figure 2:
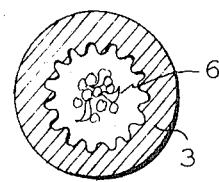

United States Patent [19]
Iida

[11] 3,809,378
[45] May 7, 1974

[54] NON-FERROUS METAL MELTING FURNACE

[75] Inventor: Hirofumi Iida, Chiba, Japan

[73] Assignees: Tokyo Gas Company Limited; Nippon Crucible Company Limited, both of Tokyo, Japan

[22] Filed: Aug. 17, 1972

[21] Appl. No.: 281,502

[30] Foreign Application Priority Data
Aug. 21, 1971 Japan.............................. 46-75151

[52] U.S. Cl............................................. 266/33 R
[51] Int. Cl........................................... F27b 19/04
[58] Field of Search ............ 266/24, 25, 33 R, 33 S; 75/43, 44 R, 44 S, 65 R

[56] References Cited
UNITED STATES PATENTS
3,715,203  2/1973  DeBie .................................. 75/65
718,726    1/1903  Pettengill et ak................. 266/33 R FOREIGN PATENTS OR APPLICATIONS
420,066    4/1947  Italy................................... 266/25

Primary Examiner—Gerald A. Dost
Attorney, Agent, or Firm—Wenderoth, Lind & Ponack

[57] ABSTRACT

A non-ferrous metal melting furnace in which a primary melting chamber is formed at the lower portion of an exhaust flue and a high velocity burner is provided in the wall of said primary melting chamber. The primary melting chamber opens into a secondary melting chamber. Metal charged into the primary melting chamber is rapidly half-melted therein by direct contact with the combustion gas discharged from said burner, and the half-melted metal is introduced into the secondary melting chamber wherein it is completely melted by radiant heat from a burner mounted in the roof of said secondary melting chamber.

2 Claims, 2 Drawing Figures

NON-FERROUS METAL MELTING FURNACE

This invention relates to a compactly contructed tower-type non-ferrous metal melting furnace capable of rapidly melting non-ferrous metal by direct heating.

In the past, so-called reverberatory furnaces have been used where melting of large amount of non-ferrous material is constantly required, such as for die casting, gravity casting or large sounds casting, and where a large amount of a molten metal is required at one time. A reverberatory furnace utilizes radiant heat from a heated up wall. Therefore, it has been necessary to make the roof which will be heated large in area and concurrently to make the hearth large so as to minimize the depth of the molten metal pool thereon. For this reason, the furnace has had the disadvantages that thf furnace body becomes large in size and the contact area between the combustion gas and molten metal becomes large, inducing absorption of gases and formation of dross. Where the metals desired to be melted are alloys such as aluminum alloys, the absorptive power of the ingot has been very small, such as only 0.04 – 0.055 at a polished surface or unpolished coarse surface and 0.11 – 0.19 even at an oxide film. Therefore, the reverberatory furnace has had the additional disadvantage that the heating rate is limited and an increase in the heating rate will only result in an increase in heat loss.

Figure 1:
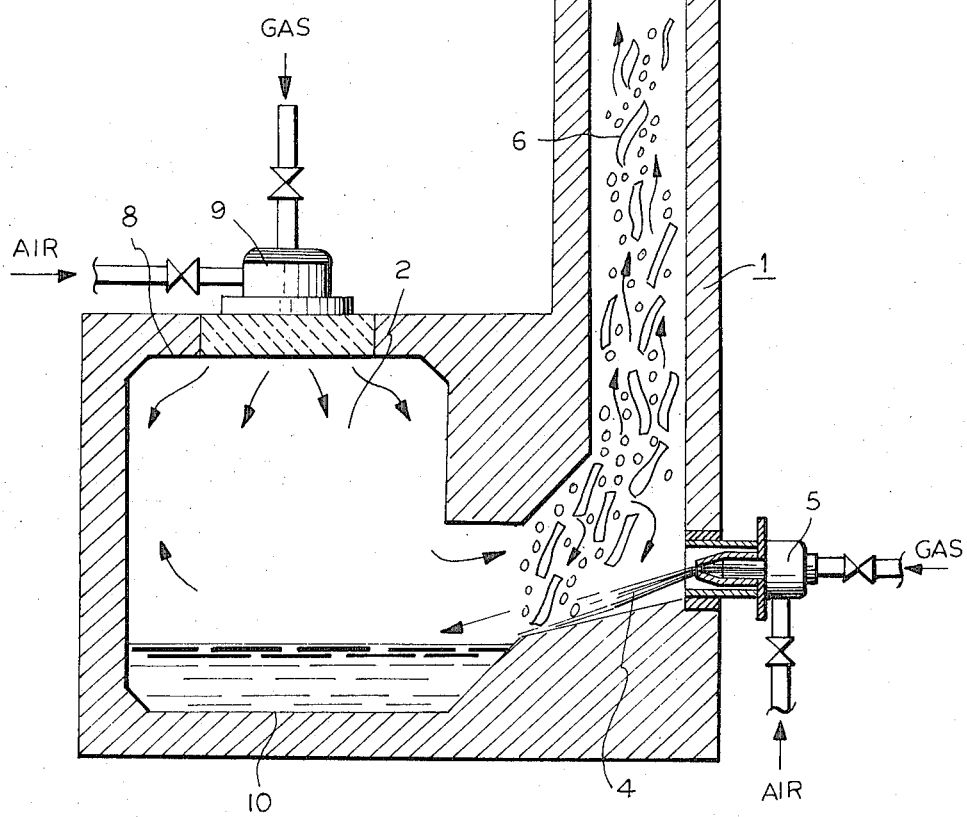

The present invention completely overcomes such disadvantages, and will be described hereinafter in connection with an embodiment thereof shown in the accompanying drawing, in which:

FIG. 1 is a vertical sectional diagrammatic view showing an embodiment of the tower-type non-ferrous metal melting furnace according to the present invention; and FIG. 2 is a cross-sectional view of an exhaust flue of another embodiment.

The melting furnace of the invention, generally indicated by reference numeral 1, has a secondary melting chamber 2, an exhaust flue 3, and a primary melting chamber 4 formed at the lower portion of said flue 3. The hearth of the primary melting chamber 4 is preferably sloped so that half-melted metal melted in said primary melting chamber will flow naturally into the secondary melting chamber 2 due to gravity. A high velocity burner 5 is mounted in the furnace wall near the bottom of the flue 3 for injecting combustion gas into the primary melting chamber 4. This high velocity burner 5 can be of any conventional type. It is directed toward the relatively large opening from the primary melting chamber into the secondary melting chamber. An inlet opening 7 is provided in flue 3 above the primary melting chamber 4 and a burner 9 is mounted on the roof 8 of secondary melting chamber 2.

Preferably, the inner wall of the exhaust flue has a wave-like shape as illustrated in FIG. 2. The provision of the wave-like wall of the inner wall of the exhaust flue increases the area of the inner wall of the flue and the contact area of the exhaust gas and the flue wall is increased as compared with an exhaust flue having a simple cylindrical inner wall. This increases the amout of heat conducted by the flue. Therefore, the amount of heat conducted to the metal desired to be melted increases indirectly and the thermal efficiency becomes higher. Further, because the space between the metals to be melted or between the inner wall of the flue and the metal to be melted is relatively large, the exhaust gas in the flue is free to pass through said space, and the resistance to the flow of the exhaust gas in the flue is greatly reduced.

The furnace of the invention, constructed as described above, operates in the following manner. When a metal 6 desired to be melted, such as ingots or scrap materials, is charged through the inlet opening 7 in the wall of the flue 3, it drops into the primary melting chamber 4 while being heated by the exhaust gases in flue 3, and it is half-melted rapidly by the direct contact with combustion gas being discharged at a high velocity from the high velocity burner 5 toward the secondary melting chamber 2. The half-melted metal flows into the secondary chamber 2. In the secondary chamber 2, the half-melted metal is completely melted by the radiant heat from the burner 9 mounted on the roof 8 of said secondary chamber.

In melting alloys, it is generally undesirable that gases such as $H_2O$, $O_2$ and $H_2$ are absorbed in the molten metal. In the present invention, however, there is substantially no possibility of such absorption because the metal is half-melted in the primary melting chamber so rapidly that the metal is held in contact with the combustion gas only for a very short period of time and also because the half-melted metal is completely melted in the secondary melting chamber by the radiant heat rather than by the heat of the combustion gas.

Thereafter, the molten metal is withdrawn from a melt discharge port (not shown) through a retainer furnace (not shown) arranged adjacent the melting furnace. It should be understood that a pusher may be provided in the primary melting chamber 4 to force the half-melted metal into the secondary melting chamber 2.

As described above, according to this invention the metal is melted to a substantial degree in the primary melting chamber 4 before it is introduced into the secondary melting chamber 2, so that it is unnecessary to make the roof 8 and the floor 10 of the secondary melting chamber 2 large. Therefore, not only is it possible to substantially reduce the size of the furnace body as compared to a conventional reverberatory furnace, but is is also possible to obtain an amount of heat about ten times as great as in a conventional reverberatory furnace to the metal desired to be melted, due to the super forced convection heat transmitting method employed, in which heat flow directly to the material is obtained by blowing combustion gas against a material which it is desired to melt. This achieves rapid melting, and consequently a melting furnace can be provided which can be operated without the formation of oxide dross and with an excellent thermal efficiency.

What is claimed is:

1. A non-ferrous metal melting furnace comprising a single exhaust flue, a primary melting chamber at the lower portion of said exhaust flue, a secondary melting chamber which said primary chamber opens for flow of metal from said primary melting chamber into said secondary melting chamber, there being a relatively large opening from said primary melting chamber into said secondary melting chamber, a single high velocity burner directed into said primary melting chamber and toward said opening into said secondary melting chamber, and radiant heating means in the upper portion of said secondary melting chamber, whereby a metal desired to be melted which is charged into said primary melting chamber through said flue is heated and half-melted directly by the combustion gas discharged from said high velocity burner, and the half-melted metal is introduced into the secondary melting chamber and completely melted therein by the radiant heating means.

2. A non-ferrous metal melting furnace as claimed in claim 1 in which said exhaust flue has an inner wall which in cross section has a wave-like shape.

* * * * *